United States Patent [19]

Kosik et al.

[11] 4,185,976
[45] Jan. 29, 1980

[54] REUSABLE DUST BAG FOR VACUUM CLEANER

[75] Inventors: John Kosik, Stamford; William P. Ritzau, Old Greenwich, both of Conn.

[73] Assignee: Consolidated Foods Corporation, Old Greenwich, Conn.

[21] Appl. No.: 886,008

[22] Filed: Mar. 13, 1978

[51] Int. Cl.² ............................................. B01D 46/02
[52] U.S. Cl. ...................................... 55/373; 55/376; 55/378; 55/DIG. 2; 55/381
[58] Field of Search ................ 55/366, 367, 376, 377, 55/378, DIG. 2, DIG. 3, 373, 381; 229/62, 62.5; 150/8

[56] References Cited

U.S. PATENT DOCUMENTS

| | | | |
|---|---|---|---|
| 2,070,674 | 2/1937 | Muentener | 55/367 |
| 2,418,371 | 4/1947 | Smellie | 229/62.5 |
| 3,237,846 | 3/1966 | Brown | 55/367 |
| 3,242,654 | 3/1966 | Kornstien et al. | 55/376 |
| 3,575,225 | 4/1971 | Muheim | 150/8 |
| 3,594,992 | 7/1971 | Carr et al. | 55/376 |

FOREIGN PATENT DOCUMENTS

1195948  11/1959  France ........................................ 55/378

*Primary Examiner*—David L. Lacey
*Attorney, Agent, or Firm*—William S. Henry

[57] ABSTRACT

In accordance with the present invention, there is provided a reusable dust bag which may be used in an enclosed-bag type of vacuum cleaner interchangeably with a disposable paper dust bag.

6 Claims, 5 Drawing Figures

REUSABLE DUST BAG FOR VACUUM CLEANER

BACKGROUND

Practically all vacuum cleaners today are designed for use with a disposable dust bag, usually made of porous paper. However, there are times when it is desirable to empty and reuse the dust bag, but it must still be usable in a cleaner designed for a disposable bag, which bag is constructed to prevent the escape of any dirt therefrom, not only while the bag is in the cleaner, but also when it is removed for disposal. Thus, in U.S. Pat. No. 2,070,674 of Feb. 16, 1937, there is shown a disposable bag including an apertured cardboard disc provided with a flap valve opening inwardly so as to permit the entrance of airborne dirt while preventing the escape of dirt when the bag is removed from the cleaner.

SUMMARY

The present invention involves a cloth dust bag having an open mouth of the same dimensions as that of the cross-section of the bag when fully distended so that its contents may be readily emptied therefrom. In order that it may be used interchangeably with a disposable bag for which the cleaner was designed, the mouth of the bag is secured to an outwardly flanged rigid rim which may be clamped in place by the front cover of the cleaner, in the same manner as is the disc of a disposable bag. To the rim is hinged a partial closure for the bag, the purpose of which is not to prevent the spillage of dirt when the bag is removed, but to provide an inlet opening into the bag in alignment with and sealable to an inlet conduit through the front cover.

Figure 1:
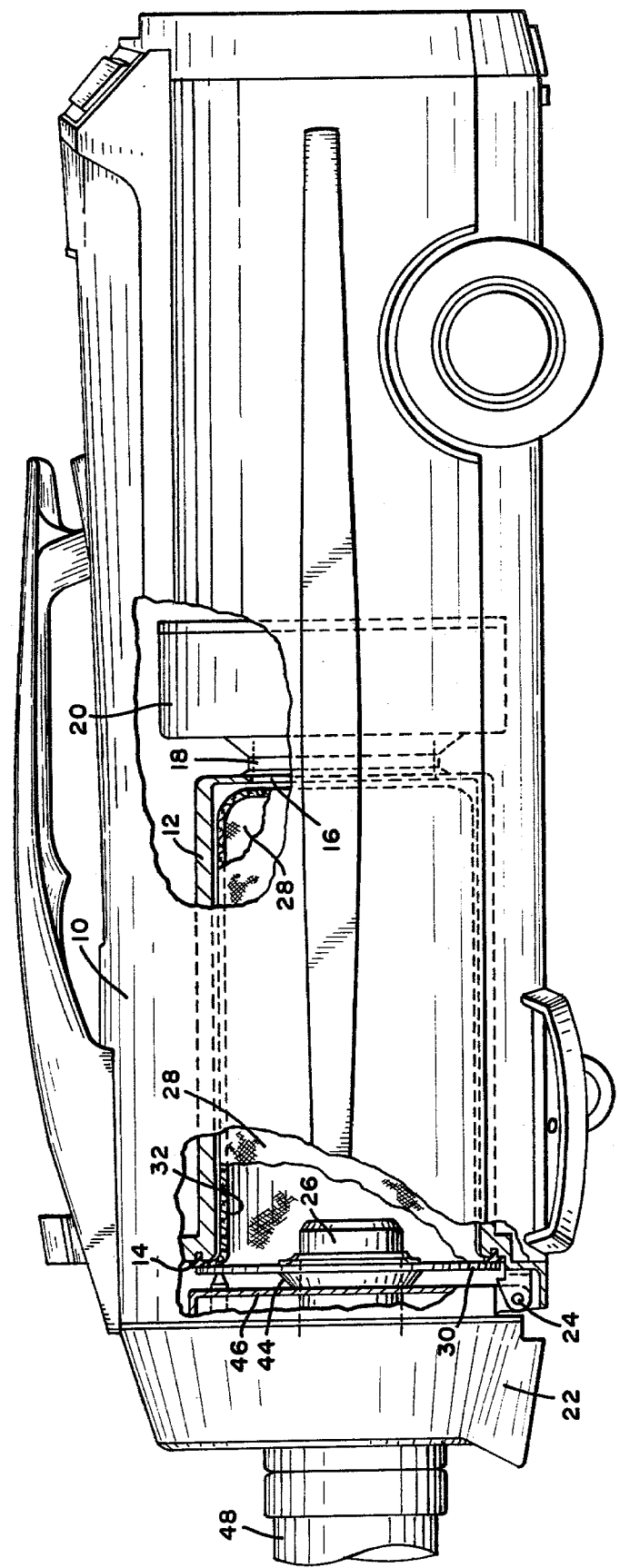
FIG. 1 (prior art) is a cross-sectional view of a vacuum cleaner with a disposable paper dust bag in place therein.
Figure 2:
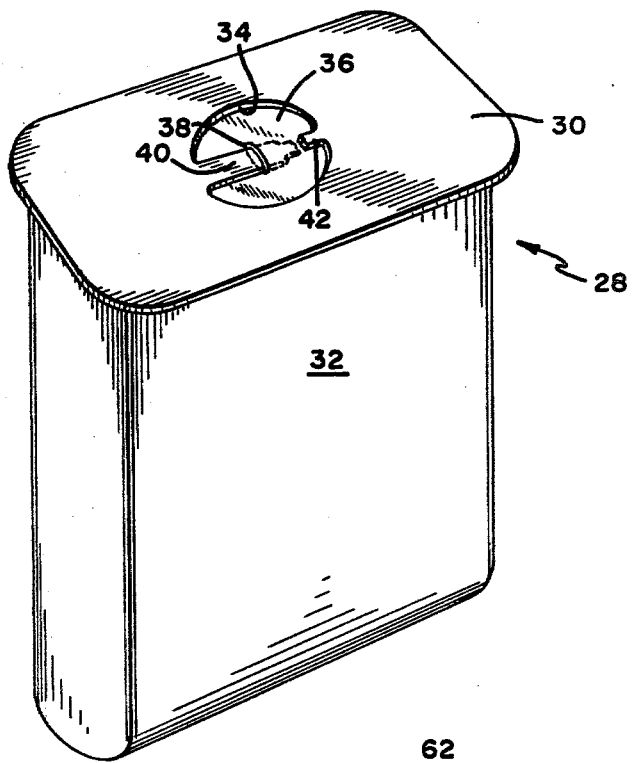
FIG. 2 (prior art) is a perspective view of the paper dust bag shown in FIG. 1.

Referring to the drawings, and particularly to FIGS. 1 and 2 which show the prior art, which is necessary for an understanding of the present invention, reference character 10 designates the outer housing of an enclosed bag type of vacuum cleaner. Within this housing is an airtight inner body 12 of generally rectangular shape which has an open mouth at one end surrounded by a gasket 14. The other end of inner body 12 has an opening 16 which is sealed to the inlet 18 of a suction fan 20 driven by an electric motor mounted in housing 10 behind the fan.

A cover 22 is hinged at 24 to the end of housing 10 adjacent to the open mouth of body 12 and carries an inlet conduit 26 which extends a short distance into the open mouth. Within inner body 12 is a disposable dust bag 28, shown in perspective in FIG. 2, usually comprising a stiff cardboard disc 30 to which is secured a filter bag 32 made of air-pervious paper. The disc is formed with an inlet aperture 34 which is substantially closed by a sheet rubber diaphragm 36 having a small centrally located opening 38. As originally manufactured, a tongue 40, of sufficient width at its central portion to cover opening 38, extended across aperture 34 and was integral with disc 30 at both ends, but near one end was formed with narrower frangible portion 42. The diameter of aperture 34 is slightly greater than that of inlet conduit 26, and the dimensions of disc 30 are about equal to those of gasket 14.

In FIG. 1 dust bag 28 is shown within inner body 12, where it was placed while cover 22 was open. When the cover was closed, conduit 26 fractured tongue 40 at its frangible portion 42 and forced the main portion of the tongue through opening 38 and conduit 26 itself entered by stretching the rubber to sufficiently enlarge the opening. At the same time, a flexible gasket 44 carried by the inner wall 46 of cover 22 engaged disc 30 around aperture 34 and forced the rear edges of the disc, which extend outwardly beyond the sides of filter bag 32, into sealing contact with gasket 14. A flexible hose 48 may be connected to cover 22 to communicate with inlet conduit 26.

During operation of the cleaner, dirt-ladened air is drawn in through hose 48 by operation of suction fan 20 and passes through conduit 26 into filter bag 32, which retains the dirt but permits the air to pass through the pores of the bag into inner body 12, from where the air passes through inlet 18 to the fan and is exhausted through a suitable outlet (not shown) in housing 10. Gaskets 14 and 44 assure that no air is drawn into the dust bag, except through inlet 26. When sufficient dirt has been collected in bag 28, the front cover 22 is opened, thus withdrawing conduit 26 from aperture 34. When this occurs, opening 38 in rubber diaphragm 36 contrasts to its original size, but tongue 40 continues to extend through opening 38, as shown in FIG. 2, so as to substantially close this opening. Consequently, when the bag is removed from the cleaner, practically no dirt will escape from the bag, which is desirable, as the bag is intended to be thrown away with its contents.

However, there are circumstances under which it is desirable to reuse the bag, but this could not be done by merely making it of more durable material than paper and cardboard, because there would be no way to empty it because of the relatively small opening 34 which is substantially closed by the diaphragm 36 and tongue 40.

Figure 4:
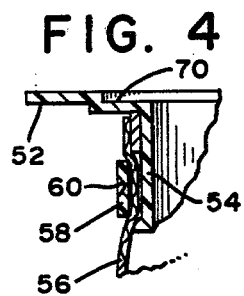
FIG. 4 is a cross-sectional view on an enlarged scale taken on the line 4—4 of FIG. 3.
Figure 5:
FIG. 5 is a cross-sectional view on an enlarged scale taken on the line 5—5 of FIG. 3.
Figure 3:
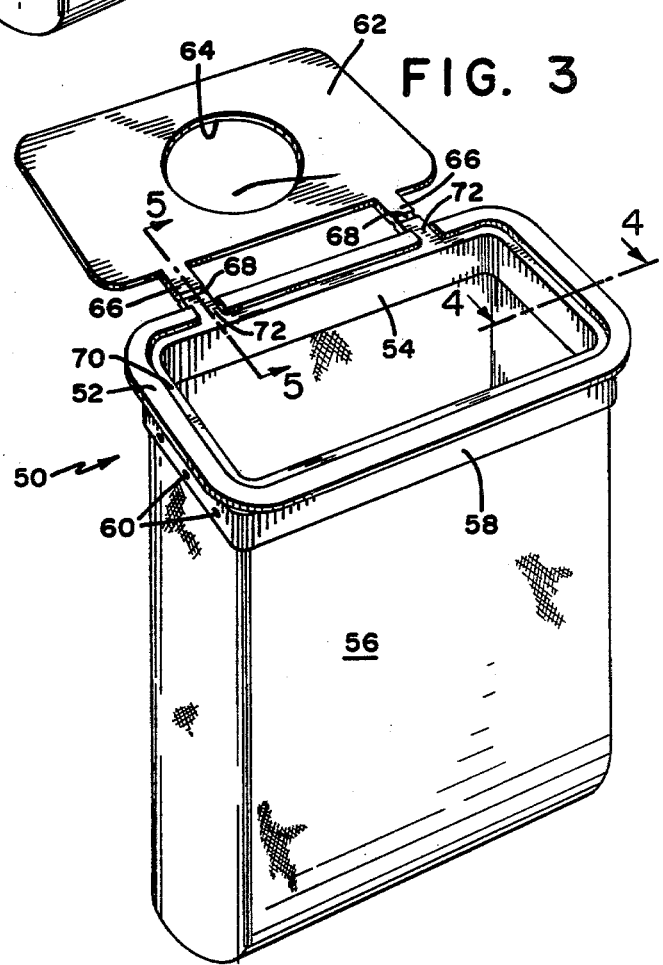
FIG. 3 is a perspective view of a reusable dust bag in accordance with the present invention.

In FIG. 3 there is shown a perspective view of a reusable dust receptacle 50 which is interchangeable with disposable receptacle 28 in cleaner 10. Bag 50 includes a rim 52 of relatively stiff and durable material, such as plastic or metal, having a peripheral configuration the same as that of disc 30. Rim 52 has a flange portion 54 to the outer surface of which is secured a cloth bag 56 of approximately the same size and shape as paper bag 32. As shown particularly in FIG. 4, the open mouth of bag 56 may be permanently secured to flange 54 by an outer band 58, which may be upset or staked as indicated at 60 to tightly secure the bag in place.

Hinged to rim 52 is a closure member 62 formed with an aperture 64 of the same diameter as aperture 34 in disc 30. If the rim 52 is of suitable plastic, closure 64 may be integrally connected to the rim by means of arms 66 formed with a thinner section 68 so as to act as a hinge permitting the closure to be pivoted 180° from the open position shown in FIG. 3 to a position closing the opening defined by flange 54. Preferably, rim 52 is recessed as shown at 70 and 72 to receive the closure member 62 and the arms 66, respectively, and permit the outer surface of closure member 62 to be flush with the outer surface of the rim when the cover is closed.

With closure 62 closed, reusable dust receptacle 50 may be placed in vacuum cleaner 10 in the same manner as disposable bag 28, the rim 52 seating on gasket 14. When cover 22 of the cleaner is closed, conduit 26 enters aperture 64 and gasket 44 seals against closure member 62 around the aperture and clamps rim 52 against gasket 14 and forces the closure member 62 against the recess 70. Subsequent operation of the cleaner causes fan 20 to draw dust-ladened air through hose 48 and conduit 26 to the interior of bag 56, the dust being retained therein while the air passes through the pores of the cloth bag to the inlet 18 of the fan.

When it is desired to empty the reusable receptable 50, cover 22 is opened and the bag removed from the cleaner 10. As the bag is closed by closure member 62, except for aperture 64, spilling of dirt is very limited, particularly if the bag is carried in a vertical position with aperture 64 at the top to the place where it is desired to dispose of the dirt, such as a waste basket or trash can. Opening of closure 62 provides an unobstructed passageway from the bag of substantially the same cross-sectional area as that of the bag itself, so if the bag is held upside down with the closure 62 open, and the bag is shaken, the dirt is readily emptied therefrom and the bag may be again placed in cleaner 10 for reuse thereon.

While there has been shown and described a more or less specific embodiment of the invention, it is to be understood that this has been done for the purpose of illustration only, and that the scope of the invention is not to be limited thereby, but is to be determined by the appended claims.

We claim:

1. In a vacuum cleaner having a dust bag compartment with gasket means at one end and a removable cover member having an inlet conduit and further including a receptacle comprising, an air porous filter bag means positioned in said bag compartment of the vacuum cleaner, said bag means being open at one end and closed at the other end, said open end of said bag means having a dimension which is substantially the same as the cross-sectional dimension of said bag means when said bag means is fully distended, a substantially rigid rim having an opening of approximately the same dimension as said open end of said bag means, said rim including an outwardly extending flange engaging the gasket means of the vacuum cleaner, means for attaching said open end of said bag means to said rim so that said rim opening is substantially in alignment with said bag means, a closure member movably connected to said rim, said closure member normally closing said rim opening, and said closure member having an inlet opening of a size to receive the inlet conduit of the cover member of the vacuum cleaner, whereby airborne foreign matter is introduced into said receptacle through the inlet conduit and may be discharged therefrom after the receptacle is removed from the vacuum cleaner by removing said closure member from said rim opening and holding said receptacle in a generally vertical position with said rim lowermost.

2. Apparatus as defined in claim 1 in which said means for attaching said open end of said bag means to said rim includes a second flange on said rim which extends generally parallel to the axis of said bag means and engages said open end thereof, band means of a configuration generally complementary to said second flange, said open end of said bag means being disposed between said second flange and said band means, and means on one of said second flange and band means for attaching said open end of said bag means to the other of said second flange and band means.

3. Apparatus as defined in claim 2 in which said second flange extends into said open end of said bag means and said band means is disposed exteriorly of said open end of said bag means.

4. Apparatus as defined in claim 2 in which said means for attaching said open end of said bag means includes a deformation on one of said second flange and band means.

5. Apparatus as defined in claim 1 in which said closure member is hingedly mounted on said rim.

6. Apparatus as defined in claim 1 in which said rim includes a recess of a size to receive said closure member so that the outer surface of said closure member is substantially flush with the outer surface of said rim.

* * * * *